US010891409B2

(12) United States Patent
Kumar et al.

(10) Patent No.: US 10,891,409 B2
(45) Date of Patent: Jan. 12, 2021

(54) ANOMALY LOCALIZATION IN A PIPELINE

(71) Applicant: INTERNATIONAL BUSINESS MACHINES CORPORATION, Armonk, NY (US)

(72) Inventors: Tarun Kumar, Mohegan Lake, NY (US); Chandramouli Visweswariah, Croton-on-Hudson, NY (US); Bo Zhang, Hoboken, NJ (US); Rui Zhang, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/661,445

(22) Filed: Oct. 23, 2019

(65) Prior Publication Data
US 2020/0159976 A1    May 21, 2020

Related U.S. Application Data

(63) Continuation of application No. 15/061,180, filed on Mar. 4, 2016, now abandoned.

(51) Int. Cl.
*G06F 30/20* (2020.01)
*G06F 17/18* (2006.01)
*G06F 111/10* (2020.01)

(52) U.S. Cl.
CPC .............. *G06F 30/20* (2020.01); *G06F 17/18* (2013.01); *G06F 2111/10* (2020.01)

(58) Field of Classification Search
None
See application file for complete search history.

(56) References Cited

U.S. PATENT DOCUMENTS

| 4,066,095 | A | 1/1978 | Massa |
| 4,796,466 | A | 1/1989 | Farmer |
| 5,272,646 | A | 12/1993 | Farmer |
| 6,970,808 | B2 | 11/2005 | Abhulimen |
| 7,418,354 | B1 | 8/2008 | Greenlee |
| 7,856,864 | B2 | 12/2010 | McEwan |
| 2013/0085690 | A1 | 4/2013 | Fei |
| 2013/0197833 | A1 | 8/2013 | Israeli |
| 2017/0255717 | A1 | 9/2017 | Kumar |

(Continued)

OTHER PUBLICATIONS

IBM: List of IBM Patents or Patent Applications Treated As Related (Appendix P), Mar. 10, 2020, pp. 1-2.

(Continued)

*Primary Examiner* — Bijan Mapar

(57) ABSTRACT

A method for locating an anomaly in a fluid transmission pipeline system is provided. The method may include receiving data for one or more physical conditions measured at an input and output of a pipeline portion, performing multiple simulations on a model of the pipeline portion to determine sets of simulated conditions that respectively correspond to simulated leak locations, determining a probability for a leak at one or more of the simulated leak locations by comparing one or more sets of simulated conditions to the received output data, and determining a highest probability location for the leak based on the probability for the leak at the one or more of the simulated leak locations. At least one simulation of the multiple simulations may be performed as a stochastic process and may be based on the received input data.

20 Claims, 6 Drawing Sheets

(56) References Cited

U.S. PATENT DOCUMENTS

2017/0323039 A1    11/2017    Kumar

OTHER PUBLICATIONS

Akib et al., "Pressure Point Analysis for Early Detection System", 2011 IEEE 7th International Colloquium on Signal Processing and its Applications, pp. 103-107.

Bai et al., "Pipeline fluid monitoring and leak location based on hydraulic transient and extended kalman filter", Journal of Computational Mechanics, 2005, vol. 22, No. 6, pp. 739-744 (English abstract, 2 pages).

Ben-Mansour, R., et al. "Computational fluid dynamic simulation of small leaks in water pipelines for direct leak pressure transduction." Computers & Fluids 57 (2012): 110-123. (Year 2012).

Guillen et al., "Modeling flow in pipes to detect and locate leaks using a state observer approach," Rev. Téc. Ing. Univ. Zulia., vol. 39, No. 1, 2016 (Best Date Available), Research Gate Article: Jan. 2015, DOI: 10.21311/001.39.1.42, pp. 364-370.

Isa et al., "Pipeline Defect Detection Using Support Vector Machines", 6th WSEAS International Conference on Circuits, Systems, Electronics, Control & Signal Processing, Cairo, Egypt, Dec. 29-31, 2007, pp. 162-168.

Kim et al., "Detection of Leak Acoustic Signal in Buried Gas Pipe Based on the Time-Frequency Analysis", Journal of Loss Prevention in the Process Industries, vol. 22, (2009), pp. 990-994.

Lay-Ekuakille et al., "Spectral Analysis of Leak Detection in a Zigzag Pipeline: A Filter Diagonalization Method-Based Algorithm Application", Measurement, vol. 42, (2009) pp. 358-367.

Ma et al., "Negative Pressure Wave-Flow Testing Gas Pipeline Leak Based on Wavelet Transform", 2010 International Conference on Computer, Mechatronics, Control and Electrical Engineering (CMCE), 2010 IEEE, pp. 306-308.

Majid et al., "Failure Analysis of Natural Gas Pipes," Engineering Failure Analysis, 2010, p. 818-837, vol. 17, Issue 4.

Martins et al., Abstract for "Assessment of the Performance of Acoustic and Mass Balance Methods for Leak Detection in Pipelines for Transporting Liquids", J. Fluids Eng. vol. 132, No. 1, Jan. 12, 2010, 8 pages, (Abstract, 3 pages).

Mashford et al., "An Approach to Leak Detection in Pipe Networks Using Analysis of Monitored Pressure Values by Support Vector Machine", 2009 Third International Conference on network and System Security, IEEE, pp. 534-539.

Poulakis (Poulakis, Z., D. Valougeorgis, and C. Papadimitriou. "Leakage detection in water pipe networks using a Bayesian probabilistic framework." Probabilistic Engineering Mechanics 18.4 (2003): 315-327.) (Year: 2003).

Ribeiro et al., "Locating Leaks with TrustRank Algorithm Support," Article in Water, Apr. 2015, DOI: 10.3390/w7041378, www.mdpi.com/journal/water, pp. 1378-1401.

Wan et al., "Hierarchical Leak Detection and Localization Method in Natural Gas Pipeline Monitoring Sensor Networks", Sensors 2012, vol. 12, pp. 189-214.

Zhou et al., "Online Updating Belief Rule Based System for Pipeline Leak Detection Under Expert Intervention", Expert Systems with Applications, vol. 36, (2009), pp. 7700-7709.

ANOMALY LOCALIZATION IN A PIPELINE

BACKGROUND

The present invention generally relates to anomaly localization in a pipeline, and more particularly locating an anomaly in a fluid transmission pipeline system.

Fluids, such as compressible gas, may be transmitted by pipeline. For example, natural gas may be transmitted by a pipeline via a high pressure gas transmission pipeline system. A leak (or an anomaly) in a pipeline may lead to a catastrophic rupture event in the pipeline. A leak may be detected by a monitoring system, e.g., a supervisory control and data acquisition (SCADA) system. However, leaks (or anomalies) in the pipeline system may be difficult to identify and locate. Sensors designed to measure certain physical conditions within a pipeline section may be biased and noisy. Moreover, such sensors may be situated at stations within the pipeline system that may be topologically connected, but separated from each other by distances from a few miles to about 50 miles.

SUMMARY

According to one embodiment, a method for locating an anomaly in a fluid transmission pipeline system is provided. The method may include receiving input and output data for one or more physical conditions respectively measured at an input and output of a pipeline portion, performing multiple simulations on a model of the pipeline portion to determine sets of simulated conditions that respectively correspond to simulated leak locations, determining a probability for a leak at one or more of the simulated leak locations by comparing one or more sets of simulated conditions to the output data, and determining a highest probability location for the leak based on the probability for the leak at the one or more of the simulated leak locations. At least one simulation of the multiple simulations may be performed as a stochastic process and may be based on the input data.

According to another embodiment, a computer program product for locating an anomaly in a fluid transmission pipeline system is provided. The computer program product may include at least one computer readable non-transitory storage medium having computer readable program instructions for execution by a processor. The computer readable program instructions may include instructions for receiving input and output data for one or more physical conditions respectively measured at an input and output of a pipeline portion, performing multiple simulations on a model of the pipeline portion to determine sets of simulated conditions that respectively correspond to simulated leak locations, determining a probability for a leak at one or more of the simulated leak locations by comparing one or more sets of simulated conditions to the output data, and determining a highest probability location for the leak based on the probability for the leak at the one or more of the simulated leak locations. At least one simulation of the multiple simulations may be performed as a stochastic process and may be based on the input data.

According to another embodiment, a computer system for locating an anomaly in a fluid transmission pipeline system is provided. The system may include at least one processing unit, at least one computer readable memory, at least one computer readable tangible, non-transitory storage medium, and program instructions stored on the at least one computer readable tangible, non-transitory storage medium for execution by the at least one processing unit via the at least one computer readable memory. The program instructions may include instructions for receiving input and output data for one or more physical conditions respectively measured at an input and output of a pipeline portion, performing multiple simulations on a model of the pipeline portion to determine sets of simulated conditions that respectively correspond to simulated leak locations, determining a probability for a leak at one or more of the simulated leak locations by comparing one or more sets of simulated conditions to the output data, and determining a highest probability location for the leak based on the probability for the leak at the one or more of the simulated leak locations. At least one simulation of the multiple simulations may be performed as a stochastic process and may be based on the input data.

BRIEF DESCRIPTION OF THE SEVERAL VIEWS OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Figure 1:
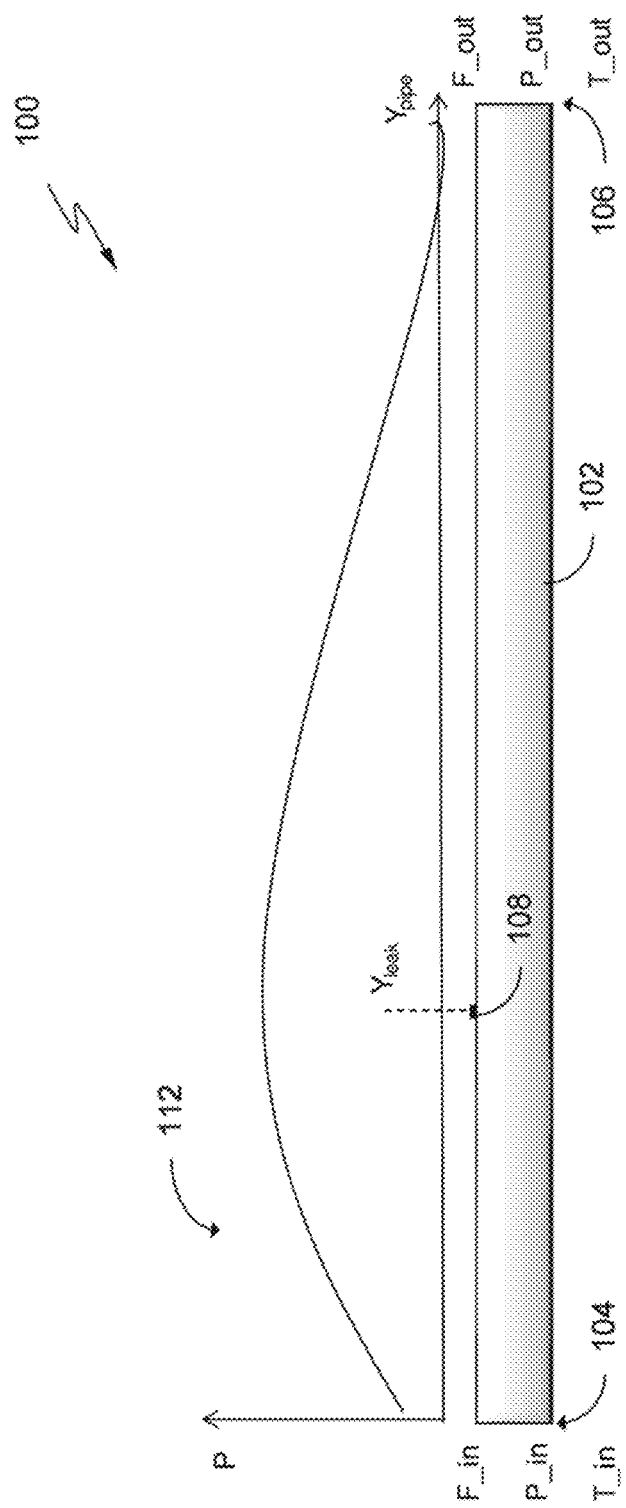
FIG. 1 is a composite diagram illustrating a leak along a portion of a pipeline and a graph representing an internal pressure along the portion of the pipeline, according to an embodiment.

Various embodiments of the present invention will now be discussed with reference to FIGS. 1-6, like numerals being used for like and corresponding parts of the various drawings.

According to one embodiment, provided is a method for locating an anomaly (e.g., a leak) in a fluid transmission pipeline system by receiving input data and output data for one or more physical conditions (e.g., flowrate, pressure, temperature) respectively measured at an input and output of a portion of a pipeline, determining a plurality of sets of conditions (i.e., simulated conditions) respectively corresponding to a plurality of simulated leaks, and comparing the simulated conditions to the measured physical conditions to determine a most-likely location of a leak in the portion of the pipeline.

According to a further embodiment, simulated conditions (i.e., a set of simulated conditions) resulting from an assumed leak at a particular location (i.e., a simulated leak location) may be determined by performing a simulation on a model of the portion of the pipeline. Different simulated leak locations may be tested in multiple simulations, and corresponding conditions resulting from each of the different simulated leak locations may be determined. Probabilities for leaks at the simulated leak locations may be determined by comparing sets of simulated conditions to the received output data, and a highest probability location for the leak may be determined from the probabilities for leaks at the simulated leak locations. At least one of the multiple simulations may be performed as a stochastic process and may be based on the received input data.

As described herein, a stochastic process may include a randomly or pseudo-randomly determined selection process for values used in the multiple simulations. For example, values provided to a simulator may be selected from a multitude of values (e.g., various pressure values, various flowrate values, and various assumed leak locations), and one or more of those values may be randomly or pseudo-randomly selected. The stochastic process may also select simulator values from live, incoming/received input data. For example, a temporal measurement of pressure at an input of a pipeline portion may be used in a particular simulation. The stochastic process may also compare simulation results (e.g., sets of simulated conditions) to live, incoming/received output data. For example, a temporal measurement of pressure at an output of a pipeline portion may be used to determine a probability of a leak at a particular location.

In an embodiment, a sufficient number of simulations may be performed to obtain enough leak location probabilities to provide an adequate distribution of probabilities prior to reaching a particular confidence level regarding the location probability for a leak.

According to one embodiment, the highest probability location for the leak may further be based on stochastically updating the probabilities for leaks at the simulated leak locations, and the one or more updated probabilities may be based on stochastically selected input data. In a further embodiment, the one or more updated probabilities may further be based on a stochastically selected simulated leak location.

The methods, computer program products, and systems disclosed herein may provide enhanced leak localization that accounts for uncertainty (e.g., noisy measurements) and sensor bias by continuously and dynamically updating numerical probability simulations in a stochastic fashion. The stochastic updating may use live, incoming/received input and output data, Michael and/or randomly or pseudo-randomly generated simulations (e.g., different configurations, simulated leak locations, simulated leak sizes, etc.).

The methods, computer program products, and systems disclosed herein may enable real time (or near real time) detection of leaks that may allow prevention of rupture events. Leak location information may provide important information for maintenance crews to address a weak spot in a pipeline and ultimately prevent a potentially catastrophic rupture event in the pipeline.

FIG. 1 is a composite diagram 100 illustrating a portion of pipeline 102 with a leak 108 and a pressure graph 112 representing an internal pressure along the portion of pipeline 102. The portion of pipeline 102 may transmit a fluid, e.g., a compressible gas under high pressure. The portion of pipeline 102 may have an input 104 (where the fluid enters the portion of pipeline 102) and an output 106 (where the fluid exits the portion of pipeline 102). At input 104, one or more physical conditions may be measured, e.g., an input flowrate (F_in), an input pressure (P_in), an input temperature (T_in). At output 106, one or more physical conditions may be measured, e.g., an output flowrate (F_out), an output pressure (P_out), an input temperature (T_out). Measurements taken at input 104 and output 106 may be biased or contain noise. For example, flowrate measurements may be highly biased and noisy relative to pressure measurements. In other examples, sensors (used to take the measurements) may introduce bias or noise.

Pressure graph 112 represents an exemplary internal pressure along the portion of pipeline 102. The internal pressure (P) is plotted as a function of distance ($Y_{pipe}$) along the portion of pipeline 102. Pressure graph 112 illustrates an exemplary increase in pressure proximate to the location of leak 108 (at $Y_{leak}$).

Figure 2:
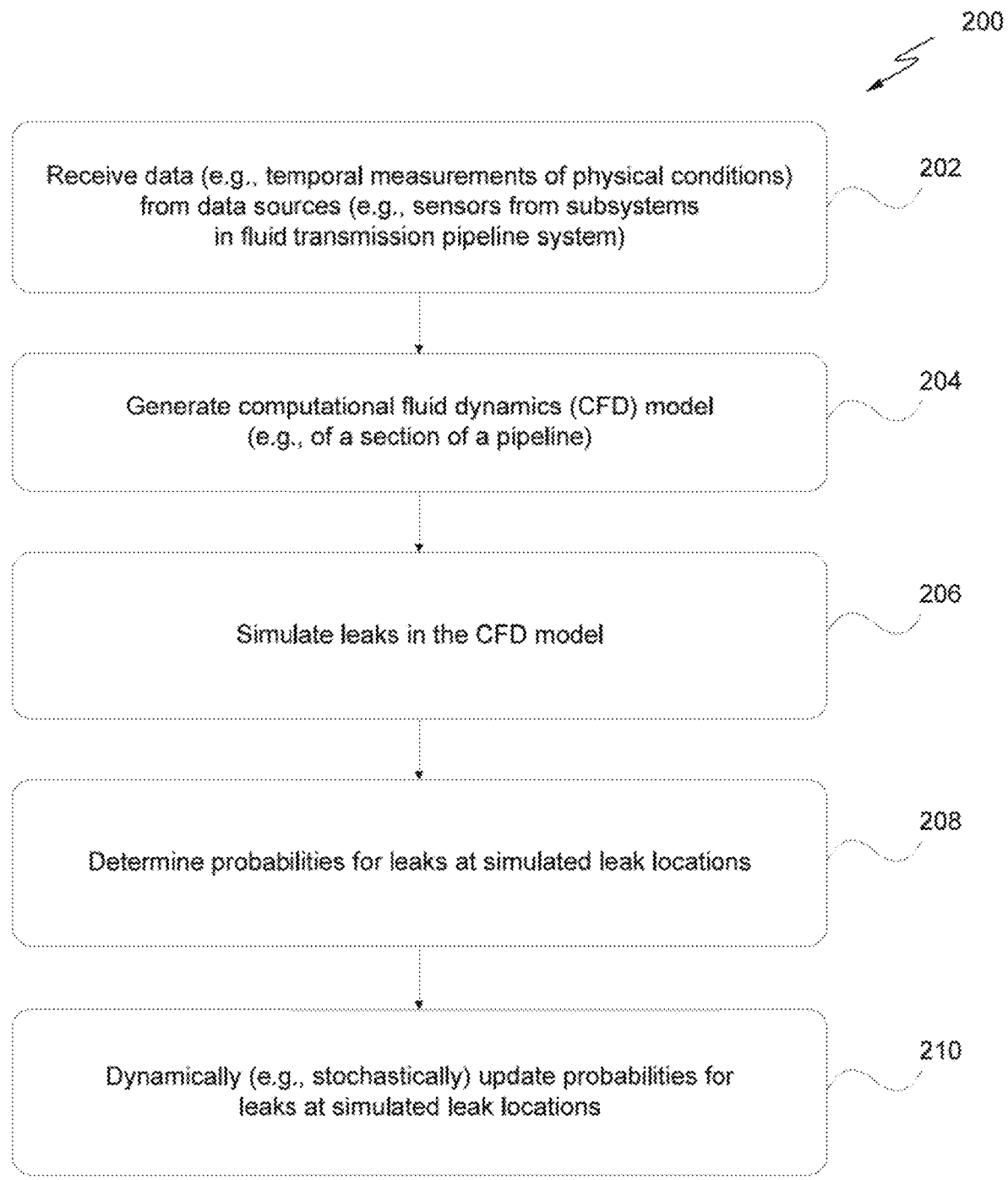
FIG. 2 is a flowchart illustrating an exemplary method for locating an anomaly in a fluid transmission pipeline system, according to an embodiment.

FIG. 2 illustrates a first flowchart 200 depicting an exemplary method for locating an anomaly in a fluid transmission pipeline system, according to an embodiment. At 202, data may be received from a fluid transmission pipeline system. The data may include temporal measurements of one or more physical conditions (e.g., flowrate, pressure, temperature). The one or more physical conditions may be measured at an input of a section of a pipeline and an output of the section of the pipeline.

The section of the pipeline may be a portion of the pipeline situated between two topologically connected stations (e.g., compressor stations). For example, the input of the pipeline section may be located at a first station and the output of the pipeline section may be located at a second station. In an embodiment, sensors (that measure physical conditions) may be located at the input of the pipeline section (e.g., at the first station) and at the output of the pipeline section (e.g., at the second station). It will be appreciated that input and output sensors need not be situated at a pipeline station, and may be situated between topologically connected stations. It will be further appreciated that a measurement sensor proximate to an input portion/section of a pipeline may be considered an input sensor, and a measurement sensor proximate to an output portion/section of the pipeline may be considered an output sensor.

The fluid transmission pipeline system (i.e., a transmission network) may include one or more subsystems. A subsystem may define a subsection of the transmission network. A subsystem may include one or more sections of a pipeline in the transmission network. Data (e.g., temporal measurements of physical conditions) may be received from one or more subsystems in the fluid transmission pipeline system.

At 204, a computational fluid dynamics model (CFD model) of a pipeline section may be generated. The CFD model may be based on a three-dimensional geometric model (3D model) for the pipeline section, which may be constructed from pipe property data and geospatial information. The 3D model may be discretized into finite elements using a meshing algorithm.

The CFD model may be based on a transient numerical simulation model for the fluid (e.g., high pressure gas) inside the pipeline section. Input variables for the transient numerical simulation model may include time-varying inlet pressure (i.e., input pressure), flowrate, and leak location (i.e., simulated leak location).

Figure 3:
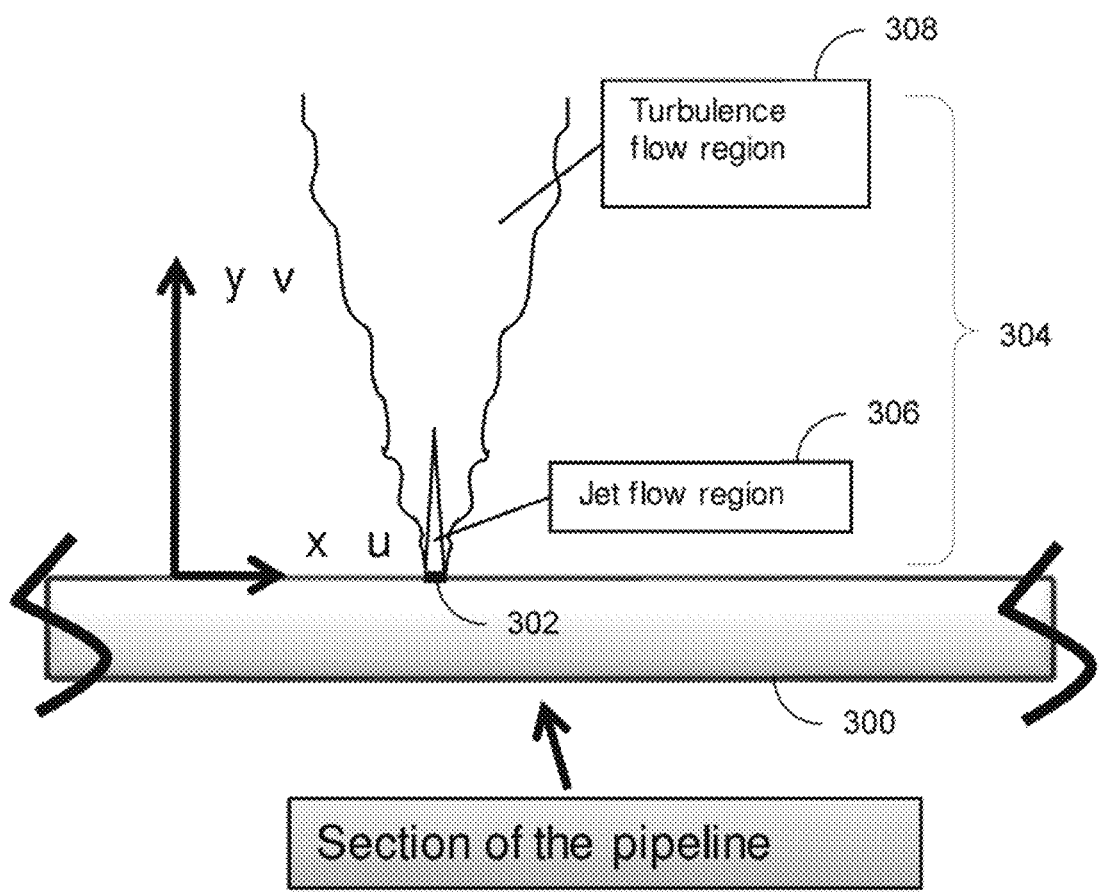
FIG. 3 is a diagram illustrating a leak along a section of a pipeline, according to an embodiment.

The CFD model may account for two sub-regions within a flow region outside an assumed leak location: a jet flow region and a turbulence flow region. Referring now to FIG. 3, a diagram of a pipeline section 300 with leak 302 is provided. Fluid flowing from leak 302 may form fluid flow region 304. Fluid flow region 304 may include a jet flow region 306 and a turbulence flow region 308. The x-axis represents a distance along the pipeline section (i.e., simulated leak location) and the y-axis represents a perpendicular distance from the pipeline section along the leak flow. Similarly, "u" represents a horizontal fluid velocity and "v" represents a vertical fluid velocity.

The jet flow region may be modeled with jet flow equations (e.g., two-dimensional laminar jet flow equations). The jet flow equations may be used to calculate boundary conditions of flowrate at the leak location as a function of pressure and leak size. Exemplary jet flow equations may include:

$$\frac{\partial u}{\partial x} + \frac{\partial v}{\partial y} = 0, \qquad \text{Equation 1}$$

$$u\frac{\partial u}{\partial x} + v\frac{\partial v}{\partial y} = -\nabla p + u\frac{\partial^2 u}{\partial^2 y}, \qquad \text{Equation 2}$$

$$u_{max}^2 \sim -\nabla p. \qquad \text{Equation 3}$$

In the above equations x and y are, respectively, a horizontal dimension along the pipeline section and a vertical dimension perpendicular to the pipeline, u and v are, respectively, horizontal and vertical fluid velocities, p is pressure, and μ is fluid viscosity. Equation 3 illustrates a relationship where stochastic variables associated with horizontal fluid velocity ($u_{max}^2$) and pressure ($-\nabla p$) may have the same statistical distributions.

The turbulence flow region may be modeled with a standard k-ε turbulence model for compressible flow and Navier-Stokes equations. Exemplary equations may include:

$$\frac{\partial \rho}{\partial t} + \frac{\partial \rho u_j}{\partial x_j} = 0, \qquad \text{Equation 4}$$

$$\frac{\partial}{\partial t}\rho u_i + \frac{\partial}{\partial x_j}[\rho u_i u_j + p\delta_{ij} - \tau_{ij}] = 0, \; i = 1, 2, 3, \qquad \text{Equation 5}$$

$$\frac{\partial \rho \varepsilon}{\partial t} + \frac{\partial \rho k u_i}{\partial x_i} = \qquad \text{Equation 6}$$
$$\frac{\partial}{\partial x_j}\left[\left(\mu + \frac{\mu_t}{\sigma_k}\right)\frac{\partial k}{\partial x_j}\right] + \mu_t\left(\frac{\partial u_j}{\partial x_i} + \frac{\partial u_i}{\partial x_j}\right)\frac{\partial u_i}{\partial x_j} - \beta g_i \frac{\mu_t}{Pr_t}\frac{\partial T}{\partial x_i} - \varepsilon,$$

$$u_j\frac{\partial \varepsilon}{\partial x_j} = \frac{\partial}{\partial x_j}\left[\left(\mu - \frac{\mu_t}{\sigma_\varepsilon}\right)\frac{\partial \varepsilon}{\partial x_j}\right] + \qquad \text{Equation 7}$$
$$\frac{\varepsilon}{k}\left[C_1\mu_t\left(\frac{\partial u_j}{\partial x_i} + \frac{\partial u_i}{\partial x_j}\right)\frac{\partial u_i}{\partial x_j}\right] - C_2\frac{\varepsilon^2}{k} + C_3\frac{\varepsilon}{k}\beta g_i\frac{\mu_t}{Pr_t}\frac{\partial T}{\partial x_i}.$$

Equation 4 represents a mass formula, where p is density and u is fluid velocity. Equation 5 represents a momentum formula, where τ is a deviatoric stress tensor. Equations 6 and 7, respectively, represent formulas for turbulent kinetic energy and a dissipation rate of turbulent kinetic energy, where μ is molecular viscosity and $\mu_t$ is turbulent viscosity, k is turbulent kinetic energy, and ε is dissipation rate of k.

Referring back to FIG. 2, at 206, leaks may be simulated in the CFD model of the pipeline section. The CFD model may determine a set of simulated conditions that may reflect one or more (simulated) physical conditions at an output of the pipeline section resulting from an assumed leak. Multiple simulations may be performed with different input variables (e.g., various pressures, flowrates, temperatures) and varying assumptions for the assumed leak (e.g., various simulated leak locations, leak sizes). As a result, multiple sets of simulated conditions may be generated that respectively correspond to particular input variables and particular leak assumptions. In an embodiment, the different input configurations (e.g., varying input variables and varying leak assumptions) for the CFD simulations may be stochastically determined. In an embodiment, input variables may be stochastically selected from input data obtained in 202 (above).

At 208, probabilities for leaks at the simulated locations may be determined based on a comparison between the one or more physical conditions measured at the output of the pipeline section and the multiple sets of simulated conditions (generated by the leak simulation performed in 206, above). The probabilities may be based on a plurality of comparisons. For example, a first set of simulated conditions may match closer to measured physical conditions than a second set of simulated conditions, but a third set of simulated conditions may match closer than the first set and so on. As such, certain sets of simulated conditions among the multiple sets may have higher probabilities than other sets of simulated conditions from the multiple sets.

In a further example, if a leak is present in a pipeline section, a particular set of simulated conditions that most closely matches actual output measurements may determine a most likely leak location. In other words, the simulated leak location corresponding to that particular set of simulated conditions may be the most likely leak location. It will be appreciated that a level of confidence (e.g., for the most likely leak location) may be based on the amount of simulations performed and comparisons made. The level of confidence may be increased by stochastically performing multiple simulations and comparisons.

At 210, the probabilities for leaks at the simulated locations may be dynamically updated by stochastically performing additional CFD simulations with different (e.g., varying) input configurations and leak assumptions. In an embodiment, the dynamic updating may be based on live or temporal incoming data for one or more physical conditions measured at the input of the pipeline section. In an embodiment, the dynamic updating may be based on live or temporal incoming data for one or more physical conditions measured at the output of the pipeline section. In an embodiment, the dynamic updating may be based on stochastically selecting input configurations and/or leak assumptions.

Figure 4:
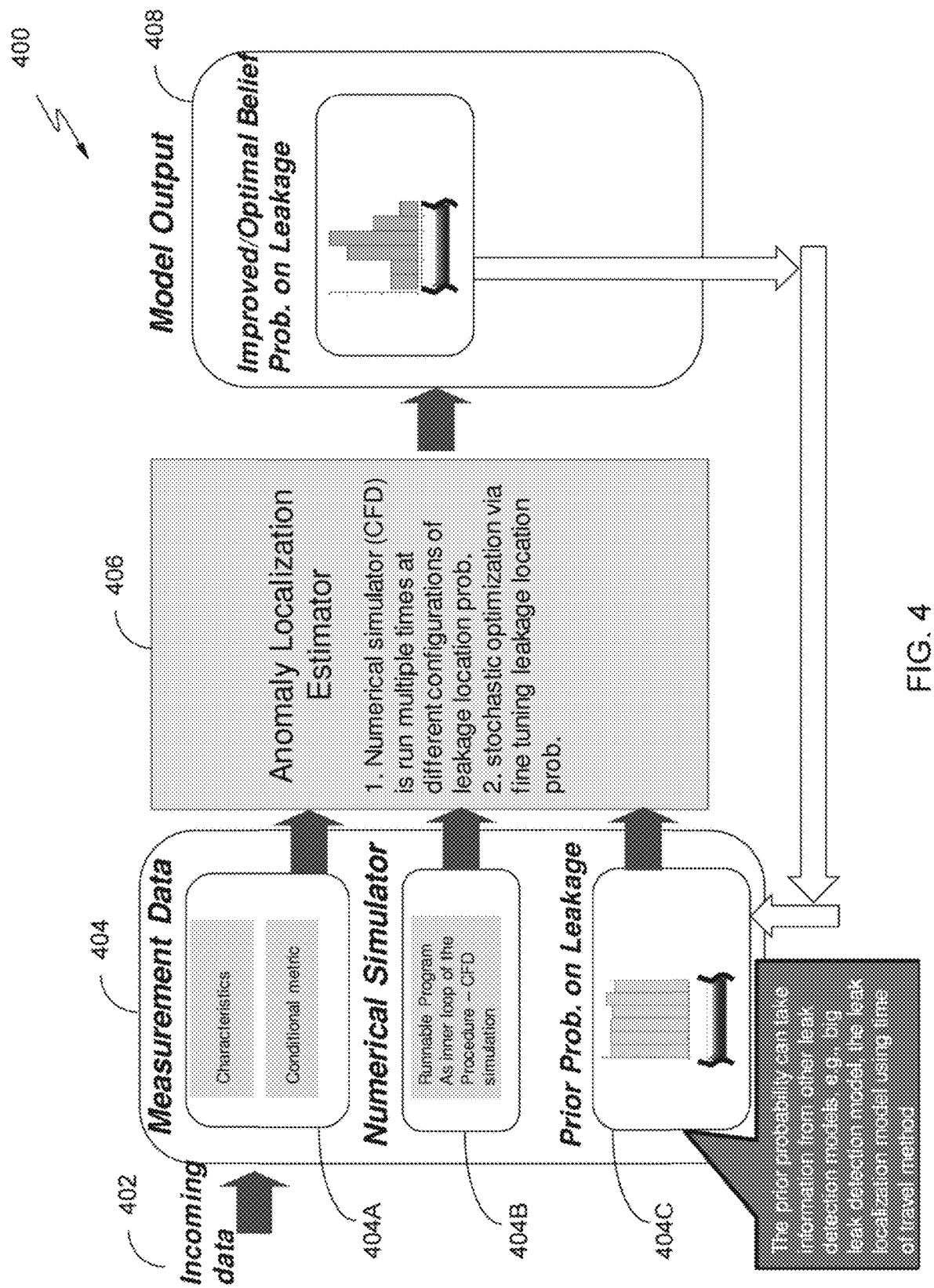
FIG. 4 is a block diagram illustrating an exemplary method for locating an anomaly in a fluid transmission pipeline system, according to an embodiment.

FIG. 4 illustrates a block diagram 400 depicting an exemplary method for locating an anomaly in a fluid transmission pipeline system, according to an embodiment. Incoming data 402 (e.g., one or more physical conditions measured at an input and/or output of a pipeline section) may be received.

At initial phase 404, incoming data 402 may be pre-processed for subsequent processing or analysis including anomaly localization estimation and generation of an optimized output model for anomaly localization. For example, measurement data 404A may be extracted from the incoming data 402 by performing various pre-process analyses (e.g., time series analytics) on the incoming data 402. Pre-process analyses may include removal of data outliers or short spikes in the data.

Pre-processing of measurement data 404A may be based on a particular characteristic for which the one or more physical conditions may be compared (e.g., matched) to the simulated conditions (generated by the CFD model simulations). A particular characteristic may include characteristic/moment generating functions of random variables, percentiles of random variables, or temporal correlations. Pre-processing may also be based on conditional metrics, e.g., the conditional distribution of the one or more measured physical conditions.

Also, at initial phase 404, numerical simulator 404B may be generated. In an embodiment, numerical simulator 404B may be the CFD model for the pipeline section, as described above. In an embodiment, numerical simulator 404B may be a program run as an inner loop of the overall method for locating an anomaly in a fluid transmission pipeline system.

Further, at initial phase 404, previously determined probabilities 404C (i.e., probabilities associated with prior simulated or detected leaks) may be received and provided as input for further processing. Previously determined probabilities 404C may include information taken from other pipeline detection methods (e.g., big leak detection model, leak localization based on time of travel methodology) and/or previous output models generated by the methods disclosed herein (e.g., model output 408).

At estimation phase 406, measurement data 404A, data from numerical simulator 404B, and/or previously determined probabilities 404C, may be received as inputs for anomaly localization estimation. Anomaly localization estimation may include running simulations on the CFD model (e.g., numerical simulator 404B) multiple times under different configurations (e.g., varying input variables, varying leak assumptions) to generate multiple sets of simulated conditions. As described above, each set of simulated conditions may correspond to a particular simulated leak location. Anomaly localization estimation may also include comparing each of the multiple sets of simulated conditions to incoming/measured output conditions (i.e., one or more physical conditions measured at the output of the pipeline section) to determine a probability of a leak at each simulated leak location.

Probabilities of leaks at the simulated leak locations may be optimized by running further simulations on the CFD model. Such further simulations may be stochastically determined (e.g., variables and configurations may be randomly or pseudo-randomly selected, and/or selected to satisfy a desired statistical distribution). Such further simulations may also be used to fine-tune the confidence level of the probabilities for leaks at simulated leak locations.

Model output 408 may be generated based on the anomaly localization estimation. Model output 408 may include one or more probabilities for a leak at one or more of the simulated leak locations. In an embodiment, model output 408 may include a most likely location (i.e., highest probability location) for a leak based on the probabilities for leaks at the simulated locations. In an embodiment, model output 408 may include a distribution of probabilities for a leak at a particular location among a plurality of simulated leak locations.

In an embodiment, information (e.g., probabilities, configurations) from model output 408 may be used in a subsequent leak localization determination by providing the information to the initial phase 404 (e.g., as part of previously determined probabilities 404C).

Figure 5:
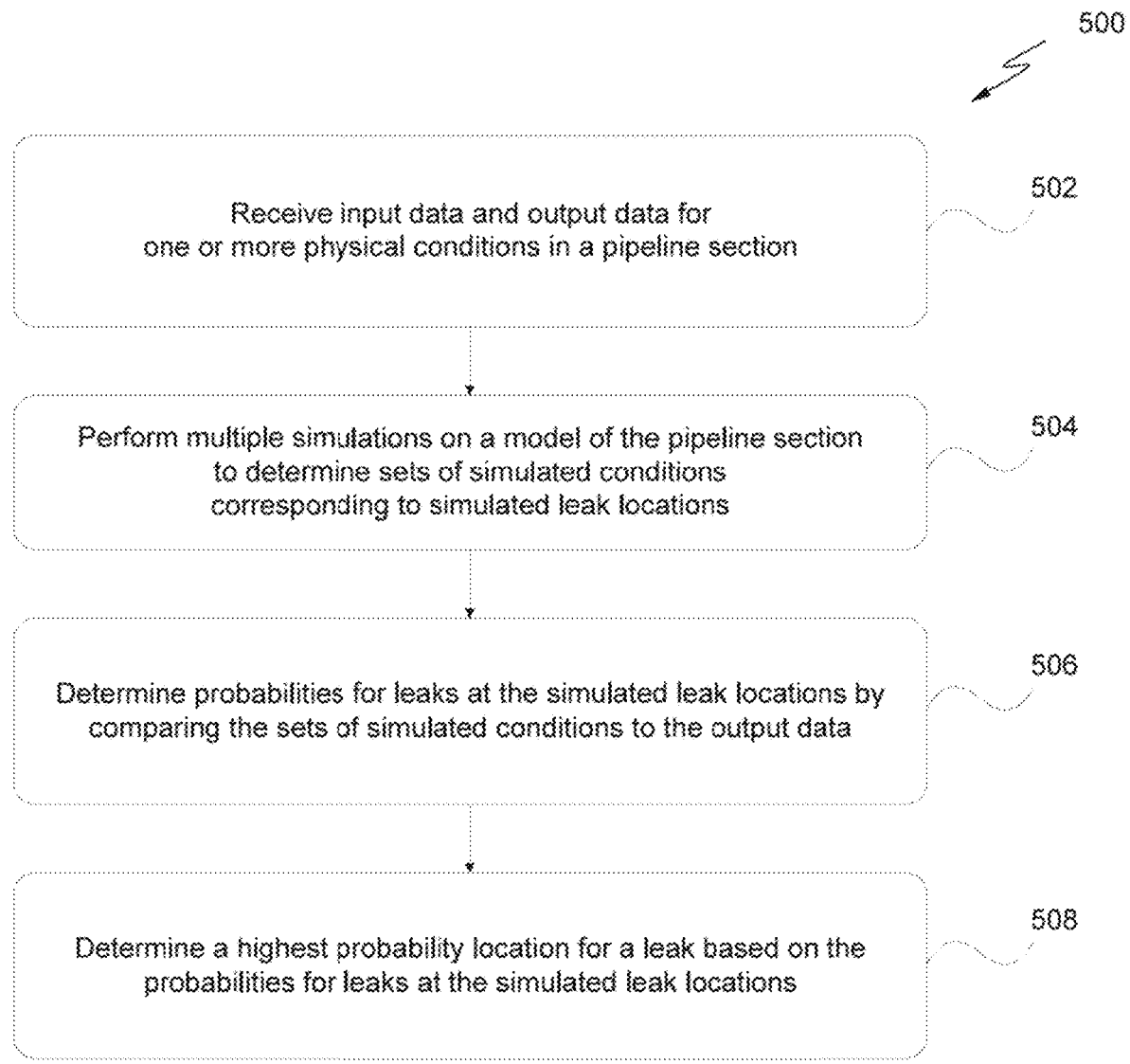
FIG. 5 is another flowchart illustrating an exemplary method for locating an anomaly in a fluid transmission pipeline system, according to an embodiment.

FIG. 5 illustrates a second flowchart 500 depicting an exemplary method for locating an anomaly in a fluid transmission pipeline system, according to an embodiment. At 502, input data and output data for one or more physical conditions in a portion of a pipeline (i.e., a pipeline section) may be received. The input data may be measured at an input of the pipeline section and the output data may be measured at an output of the pipeline section. The one or more physical conditions may include flowrate, pressure, or temperature.

At 504, multiple simulations on a model of the pipeline section may be performed to determine sets of simulated conditions corresponding to simulated leak locations. The model of the pipeline section may be a CFD model based on a 3D model for the pipeline section and may further be based on a transient numerical simulation model for fluid (e.g., compressible, high pressure gas) inside the pipeline section. Each simulation from the multiple simulations may determine a set of simulated conditions that corresponds to a particular simulated leak location. The multiple simulations may determine a plurality of sets of simulated conditions that respectively correspond to a plurality of simulated leak locations. In an embodiment, sets of simulated conditions may further respectively correspond to other simulated leak assumptions such as leak size.

In an embodiment, at least one simulation of the multiple simulations may be performed as a stochastic process and may be based on the input data. The stochastic process may include randomly or pseudo-randomly generated simulations (e.g., different configurations, simulated leak locations, simulated leak sizes, etc.), and/or randomly or pseudo-randomly selected incoming/received input data. In an embodiment, the multiple simulations may have one or more aspects (e.g., a particular variable or configuration) representing a desired statistical distribution among the multiple simulations.

At 506, probabilities for leaks at the simulated leak locations may be determined by comparing the sets of simulated conditions to the output data (i.e., output data measured at the output of the pipeline section). In an embodiment, a probability for a leak at one or more simulated leak locations from the plurality of simulated leak locations may be determined by comparing one or more sets of simulated conditions from the plurality of sets of simulated conditions to the output data.

At 508, a highest probability location for a leak may be determined based on the probabilities for leaks at the simulated leak locations. In an embodiment, a highest probability location for the leak may be determined based on the probability for the leak at one or more simulated leak locations from the plurality of simulated leak locations.

The methods, computer products, and systems disclosed herein may identify a most likely location (i.e., a highest probability location) for a leak within a pipeline section in a fluid transmission pipeline system based on stochastically performed simulations on a model of the pipeline section, and may further account for compressible flow within the pipeline section (e.g., associated with high pressure gas transmission). Localization of a leak may be determined in real time (or near real time) by stochastically and dynamically updating probability estimates and/or updating simulations performed on a model of a pipeline section. Stochastic and dynamic updates may be based on live, incoming data (e.g., measurements of one or more physical conditions).

It is contemplated that real time (or near real time) localization of a leak may be associated with an alarm indicating that a leak has occurred. It is further contemplated that the methods disclosed herein may be incorporated into a leak detection system, and may further provide a real time (or near real time) leak alert by continuously (and stochastically) comparing live, incoming pipeline data to sets of simulated conditions (corresponding to assumed leaks). For example, an alert may be triggered when live, incoming output data matches a set of simulated conditions above a certain confidence level (e.g., a determined probability of a leak at a simulated location exceeds a predetermined threshold). It will be appreciated that, as disclosed herein, such an alert may also include the location of the assumed leak corresponding to the matching set of simulated conditions.

In one embodiment, determining the highest probability location for the leak is further based on stochastically updating the probability for the leak at one or more simulated leak locations, and the one or more updated probabilities are based on stochastically selected input data. In a further embodiment, the one or more updated probabilities are further based on a stochastically selected simulated leak location.

In one embodiment, the one or more physical conditions includes at least one of a flow rate, a pressure, or a temperature.

In one embodiment, the fluid transmission pipeline system transmits a compressible fluid. In a further embodiment, the fluid transmission pipeline system is a high pressure gas transmission pipeline system.

In one embodiment, one or more simulations from the multiple simulations is further based on data from a previous simulation on the model of the portion of the pipeline.

In one embodiment, the model of the portion of the pipeline is a transient numerical simulation model based on flowrate, pressure, and the plurality of simulated leak locations. In a further embodiment, the transient numerical simulation model is further based on a three-dimension geometrical model of the portion of the pipeline. In another further embodiment, one or more simulations from the multiple simulations is further based on data from another model associated with the portion of the pipeline.

Embodiments disclosed and contemplated herein may be implemented and/or performed by any type of computer, known or contemplated, regardless of the platform being suitable for storing and/or executing program code.

Figure 6:
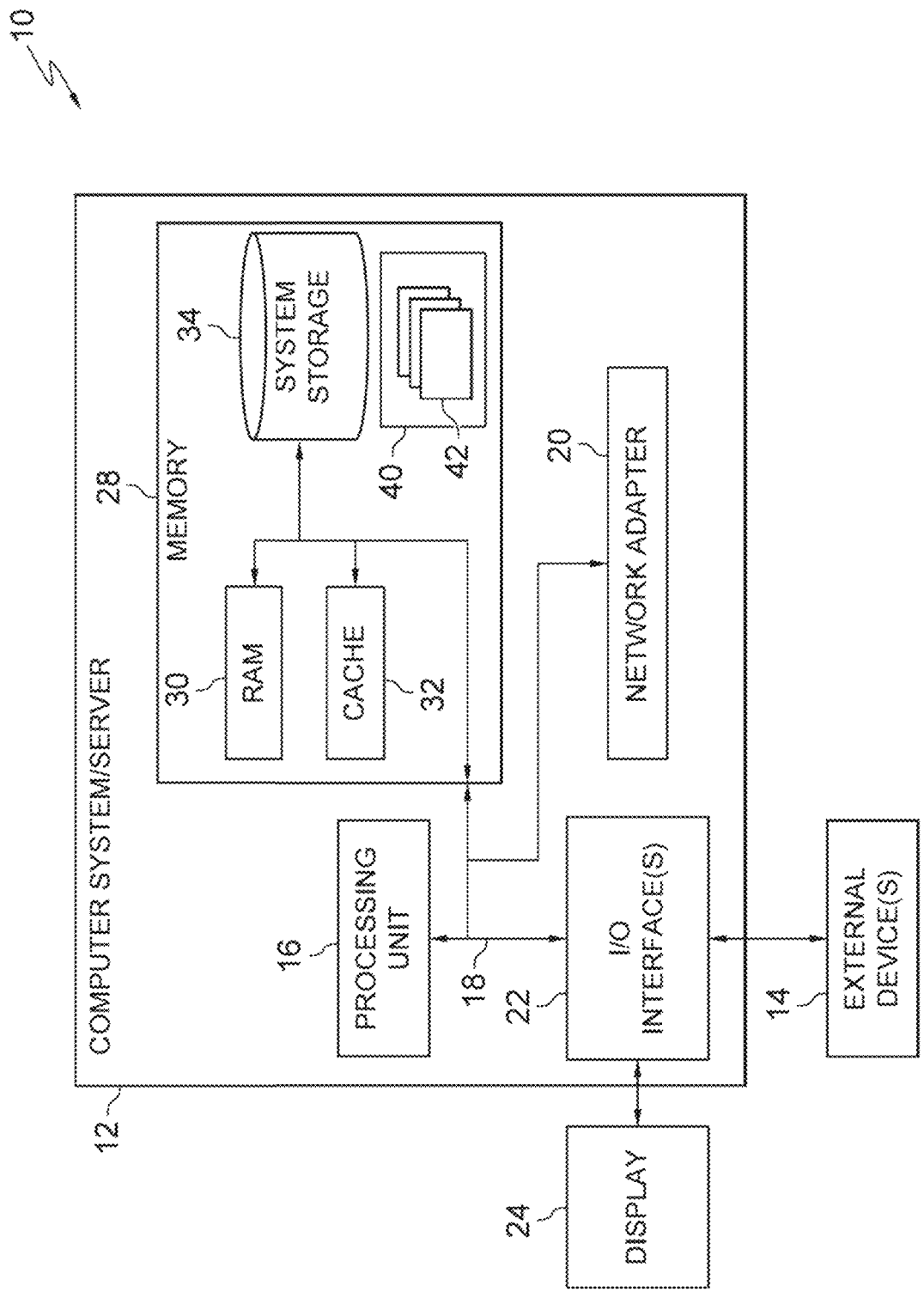
FIG. 6 is a block diagram illustrating a computing node, according to an aspect of the invention.

FIG. 6 depicts a schematic illustrating an example of a computing node. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 6, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for real time detection of a location of an anomaly in a fluid transmission pipeline system to prevent a rupture in the fluid transmission pipeline system, the method comprising:

receiving, by a computing node, live input data and output data for one or more physical conditions of a fluid from an input sensor located at an input of a portion of a pipeline and an output sensor located at an output of the portion of the pipeline, wherein the live input data is measured by the input sensor at the input of the portion of the pipeline and the output data is measured by the output sensor at the output of the portion of the pipeline;

performing, by the computing node, multiple simulations using a computational fluid dynamics (CFD) model of the portion of the pipeline, wherein each simulation determines a set of simulated conditions that corresponds to a simulated leak location of the fluid, and wherein the multiple simulations determine, by the computing node, a plurality of sets of simulated conditions that respectively correspond to a plurality of simulated leak locations of the fluid;

determining, by the computing node, a probability for a leak at one or more simulated leak locations of the fluid from the plurality of simulated leak locations by comparing one or more sets from the plurality of sets of simulated conditions to the output data;

determining, by the computing node, a highest probability location for the leak based on stochastically updating the probability for the leak at one or more simulated leak locations from the plurality of simulated leak locations, wherein the one or more updated probabilities may further be based on a stochastically selected simulated leak location, and wherein at least one simulation of the multiple simulations is performed as a stochastic process and is based on the live input data; and preventing the rupture in the fluid transmission pipeline system, by maintenance crews, based on determining the highest probability location for the leak, wherein the maintenance crews address a weak spot in the pipeline based on the highest probability location.

2. The method according to claim 1, wherein determining the highest probability location for the leak is further based on stochastically updating the probability for the leak at the one or more simulated leak locations, and wherein the one or more updated probabilities are based on stochastically selected input data.

3. The method according to claim 2, wherein the one or more updated probabilities are further based on a stochastically selected simulated leak location.

4. The method according to claim 1, wherein the one or more physical conditions comprise at least one of a flowrate, a pressure, or a temperature.

5. The method according to claim 1, wherein the fluid transmission pipeline system transmits a compressible fluid.

6. The method according to claim 5, wherein the fluid transmission pipeline system is a high pressure gas transmission pipeline system.

7. The method according to claim 1, wherein one or more simulations from the multiple simulations is further based on data from a previous simulation on the model of the portion of the pipeline.

8. The method according to claim 1, wherein the model of the portion of the pipeline is a transient numerical simulation model based on flowrate, pressure, and the plurality of simulated leak locations.

9. The method according to claim 8, wherein the transient numerical simulation model is further based on a three-dimension geometrical model of the portion of the pipeline.

10. The method according to claim 9, wherein one or more simulations from the multiple simulations is further based on data from another model associated with the portion of the pipeline.

11. A computer program product for real time detection of a location of an anomaly in a fluid transmission pipeline system to prevent a rupture in the fluid transmission pipeline system, the computer program product comprising at least one computer readable non-transitory storage medium having computer readable program instructions thereon for execution by a processor, the computer readable program instructions comprising program instructions for:

receiving, by a computing node, live input data and output data for one or more physical conditions of a fluid from an input sensor located at an input of a portion of a pipeline and an output sensor located at an output of the portion of the pipeline, wherein the live input data is measured by the input sensor at the input of the portion of the pipeline and the output data is measured by the output sensor at the output of the portion of the pipeline;

performing, by the computing node, multiple simulations using a computational fluid dynamics (CFD) model of the portion of the pipeline, wherein each simulation determines a set of simulated conditions that corresponds to a simulated leak location of the fluid, and wherein the multiple simulations determine, by the computing node, a plurality of sets of simulated conditions that respectively correspond to a plurality of simulated leak locations of the fluid;

determining, by the computing node, a probability for a leak at one or more simulated leak locations of the fluid from the plurality of simulated leak locations by comparing one or more sets from the plurality of sets of simulated conditions to the output data;

determining, by the computing node, a highest probability location for the leak based on stochastically updating the probability for the leak at one or more simulated leak locations from the plurality of simulated leak locations, wherein the one or more updated probabilities may further be based on a stochastically selected simulated leak location, and wherein at least one simulation of the multiple simulations is performed as a stochastic process and is based on the live input data; and preventing the rupture in the fluid transmission pipeline system, by maintenance crews, based on determining the highest probability location for the leak, wherein the maintenance crews address a weak spot in the pipeline based on the highest probability location.

12. The computer program product according to claim 11, wherein determining the highest probability location for the leak is further based on stochastically updating the probability for the leak at the one or more simulated leak locations, and wherein the one or more updated probabilities are based on stochastically selected input data.

13. The computer program product according to claim 12, wherein the one or more updated probabilities are further based on a stochastically selected simulated leak location.

14. The computer program product according to claim 11, wherein the one or more physical conditions comprise at least one of a flowrate, a pressure, or a temperature.

15. The computer program product according to claim 11, wherein the fluid transmission pipeline system transmits a compressible fluid.

16. A computer system for real time detection of a location of an anomaly in a fluid transmission pipeline system to prevent a rupture in the fluid transmission pipeline system, the computer system comprising:
at least one processing unit;
at least one computer readable memory;
at least one computer readable tangible, non-transitory storage medium; and
program instructions stored on the at least one computer readable tangible, non-transitory storage medium for execution by the at least one processing unit via the at least one computer readable memory, wherein the program instructions comprise program instructions for:
receiving live input data and output data for one or more physical conditions of a fluid from an input sensor located at an input of a portion of a pipeline and an output sensor located at an output of the portion of the pipeline, wherein the live input data is measured by the input sensor at the input of the portion of the pipeline and the output data is measured by the output sensor at the output of the portion of the pipeline, wherein the live input data is measured at an input of a portion of a pipeline and the output data is measured at an output of the portion of the pipeline;

performing multiple simulations using a computational fluid dynamics (CFD) model of the portion of the pipeline, wherein each simulation determines a set of simulated conditions that corresponds to a simulated leak location of the fluid, and wherein the multiple simulations determine a plurality of sets of simulated conditions that respectively correspond to a plurality of simulated leak locations;

determining a probability for a leak at one or more simulated leak locations from the plurality of simulated leak locations by comparing one or more sets from the plurality of sets of simulated conditions to the output data;

determining a highest probability location for the leak based on stochastically updating the probability for the leak at one or more simulated leak locations from the plurality of simulated leak locations, wherein the one or more updated probabilities may further be based on a stochastically selected simulated leak location, and wherein at least one simulation of the multiple simulations is performed as a stochastic process and is based on the live input data; and preventing the rupture in the fluid transmission pipeline system, by maintenance crews, based on determining the highest probability location for the leak, wherein the maintenance crews address a weak spot in the pipeline based on the highest probability location.

17. The computer system according to claim 16, wherein determining the highest probability location for the leak is further based on stochastically updating the probability for the leak at the one or more simulated leak locations, and wherein the one or more updated probabilities are based on stochastically selected input data.

18. The computer system according to claim 17, wherein the one or more updated probabilities are further based on a stochastically selected simulated leak location.

19. The computer system according to claim 16, wherein the one or more physical conditions comprise at least one of a flowrate, a pressure, or a temperature.

20. The computer system according to claim 16, wherein the fluid transmission pipeline system transmits a compressible fluid.

* * * * *